UNITED STATES PATENT OFFICE.

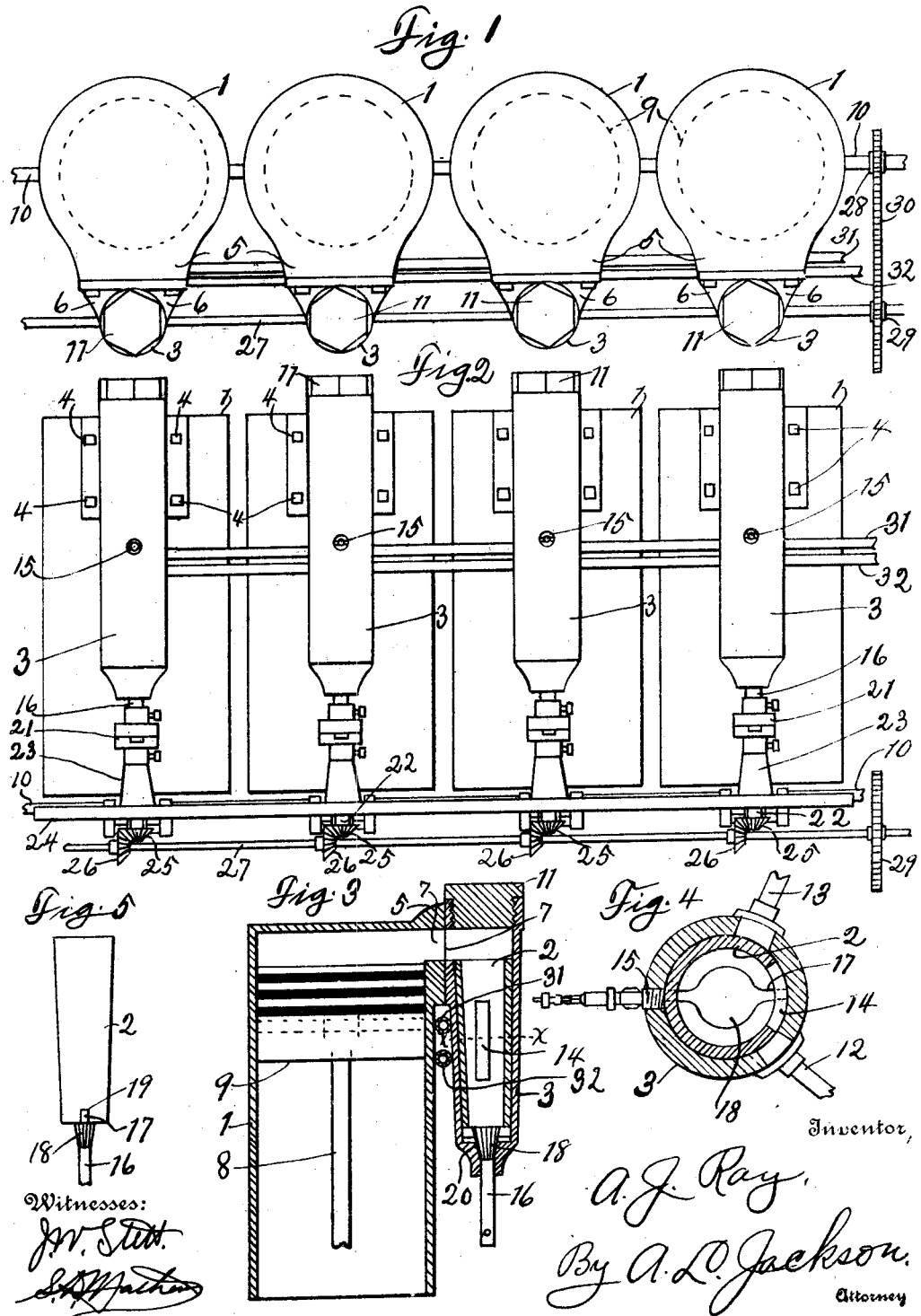

ALBERT J. RAY, OF FORT WORTH, TEXAS, ASSIGNOR OF ONE-THIRD TO A. J. BENEKE AND ONE-THIRD TO D. WELLS, BOTH OF FORT WORTH, TEXAS.

VALVE FOR EXPLOSIVE-ENGINES.

1,071,958.  Specification of Letters Patent.  Patented Sept. 2, 1913.

Application filed December 20, 1910. Serial No. 598,463.

*To all whom it may concern:*

Be it known that I, ALBERT J. RAY, a citizen of the United States, residing at Fort Worth, in the county of Tarrant and State of Texas, have invented certain new and useful Improvements in Valves for Explosive-Engines, of which the following is a specification.

My invention relates to valves for explosive engines and particularly to valves of the rotary type, and the object is to produce noiseless valves which are in communication with the engine cylinders, which have conical or tapering surfaces so that the valves will be self-grinding and self-adjusting, and which will cover and uncover the sparking plug in such manner as to prevent the fouling of the sparking plug.

Other objects and advantages will be fully explained in the following description and the invention will be more particularly pointed out in the claims.

Reference is had to the accompanying drawings which form a part of this application.

Figure 1 is a plan view of four engine cylinders with the improved valves connected thereto. Fig. 2 is a side elevation of the same. Fig. 3 is a vertical section of an engine cylinder and a connected valve. Fig. 4 is an enlarged horizontal section, taken on the line $x$—$x$ of Fig. 3. Fig. 5 is a side elevation of one of the valves, illustrating the manner of connecting the valve with a driving mechanism.

Similar characters of reference are used to indicate the same parts throughout the several views.

The drawings show a plurality of engine cylinders 1 and a plurality of valves 2, the casings 3 of which are connected or attached to the cylinders 1 by bolts 4. Each cylinder has a lateral extension 5 and each valve casing has a lateral extension 6. The extensions 5 and 6 have ground faces and communication is made from valve to cylinder through perforations 7 in these extensions which register with each other and are held in position by the bolts 4. The cylinders 1 are provided with piston rods 8 and piston heads 9. The piston rods 8 are operatively connected to a crank shaft 10. The casings 3 are closed by plugs 11. Each casing 3 has an intake 12 and exhaust 13. The casing 3 carries a sparking plug 15. The valve 2 constitutes in part the combustion chamber and the valve is tapered so that it will be self adjusting in the casing 3. The valve 2 has a port 14 intermediate the ends thereof and is open at both ends, thus forming a balanced valve. The valve 2 is driven by gearing. The valve is connected to the gearing by a stem 16 which has a T-head 17 and a conical seating portion 18. The T-head 17 is caught in slots 19 in the lower end of the valve 2. The valve 2 rests by gravity on the T-head and will remain in engagement with the T-head 17. A funnel shaped seat 20 is formed in the bottom of the casing for the seating portion 18. The valve 2 is thus seated in the bottom of the casing 3 and will adjust itself continually by the gradual wear of the conical seating portion 18 on the seat. The T-head will be held above the bottom of the casing 3, as shown in Fig. 3 so that the explosive mixture will descend lower than the valve 2. Each stem 16 is connected to a universal joint 21 which is operatively connected to a shaft 22. Each shaft 22 is journaled in a bearing 23 and all the bearings 23 may be formed integral with a bar 24. A bevel gear 25 is mounted on each shaft 22 and each bevel gear 25 is driven by a bevel gear 26 which is mounted on a shaft 27. The shaft 27 is driven from the shaft 10 by means of a sprocket wheel 28 on shaft 10, a sprocket wheel 29 on shaft 27 and a sprocket chain 30. The intake 12 may be supplied through pipe 31 and the exhaust may be discharged through a pipe 32.

It will be seen that in operation the sparking plug 15 will be covered except during ignition and there will be no danger of fouling the sparking plug by short-circuiting.

Having fully described my invention, what I claim as new and desire to secure by Letters Patent, is,—

1. A valve for explosive engines comprising a casing in communication with the engine cylinder and having intake and exhaust ports, a chambered conical valve rotating in said casing and provided with a port intermediate the ends thereof passing said intake and exhaust ports, said valve being spaced from the upper end of said casing, a stem engaging said valve and spacing the same above the lower end of said casing and having a conical seating portion, and a seat formed in said casing conforming to the contour of the seating portion of said stem, the spaces above and below said valve constituting in part the combustion chamber whereby explosive force is exerted on the ends of said valve to prevent end thrusts of said valve.

2. A valve for explosive engines comprising a casing in communication with the engine cylinder and having intake and exhaust ports, a valve stem hung in the lower end of said casing and having a T-head and a conical seating portion, a seat in the lower end of said casing conforming to the contour of said seating portion, and a chambered conical valve rotating in said casing and provided with a port passing said intake and exhaust ports and resting by gravity on said T-head, the lower edge of said valve having recesses therein to receive said T-head, whereby said valve is spaced from the lower end of said casing, and means for sparking said valve.

3. In a valve for explosive engines, a casing in communication with the engine cylinder and having intake and exhaust ports, a chambered valve open at both ends and constituting in part the combustion chamber and provided with a port adapted to pass said intake and exhaust ports, means for sparking the explosive mixture within said valve, and a stem provided with means for suspending and rotating the valve intermediate the ends of the casing and for holding the valve away from the ends of the casing whereby explosive force is exerted between the ends of the casing and the ends of the valve for balancing the valve and for preventing end thrust of the valve against the casing.

In testimony whereof, I set my hand in the presence of two witnesses, this 30th day of November, 1910.

ALBERT J. RAY.

Witnesses:
A. L. JACKSON,
L. T. KNIGHT.

Copies of this patent may be obtained for five cents each, by addressing the "Commissioner of Patents, Washington, D. C."